(12) United States Patent
Benyezzar

(10) Patent No.: US 12,484,635 B2
(45) Date of Patent: Dec. 2, 2025

(54) SYSTEM FOR CONTROLLING A SMOKING SUBSTITUTE DEVICE

(71) Applicant: Imperial Tobacco Limited, Bristol (GB)

(72) Inventor: Mohammed Benyezzar, Liverpool (GB)

(73) Assignee: IMPERIAL TOBACCO LIMITED, Bristol (GB)

( * ) Notice: Subject to any disclaimer, the term of this patent is extended or adjusted under 35 U.S.C. 154(b) by 926 days.

(21) Appl. No.: 17/701,337

(22) Filed: Mar. 22, 2022

(65) Prior Publication Data

US 2022/0273046 A1 Sep. 1, 2022

Related U.S. Application Data

(63) Continuation of application No. PCT/EP2020/076960, filed on Sep. 25, 2020.

(30) Foreign Application Priority Data

Sep. 25, 2019 (EP) ..................................... 19199690

(51) Int. Cl.
*A24F 40/57* (2020.01)
*A24F 40/51* (2020.01)
(Continued)

(52) U.S. Cl.
CPC .............. *A24F 40/57* (2020.01); *A24F 40/51* (2020.01); *A24F 40/53* (2020.01); *H05B 1/0252* (2013.01)

(58) Field of Classification Search
None
See application file for complete search history.

(56) References Cited

U.S. PATENT DOCUMENTS 5,397,515 A * 3/1995 Searle ..................... B29C 45/78
700/202
5,778,689 A * 7/1998 Beatenbough ....... H05B 1/0236
219/218
(Continued)

FOREIGN PATENT DOCUMENTS

EP 0945773 A1 * 9/1999 .............. A47J 27/62
GB 2 537 121 A 10/2016
(Continued)

OTHER PUBLICATIONS

EP 0945773 A1 (Bogdanski, Franz et al.) Sep. 29, 1999 [retrieved on Aug. 19, 2025]. Retrieved from Foreign Image and Text database, translation by Clarivate Analytics. (Year: 1999).*
(Continued)

*Primary Examiner* — John J Norton
(74) *Attorney, Agent, or Firm* — Perkins Coie LLP; Kenneth H. Ohriner

(57) ABSTRACT

A system for controlling a smoking substitute device having a heating element. The system comprises a receiver module configured to receive a periodic signal. The periodic signal is in the form of a series of signal events. The system also comprises a sensor configured to determine a temperature of the heating element in response to the receipt of a signal event of the periodic signal by the receiver module, and a controller. If the determined temperature is below a predetermined threshold, the controller is configured to cause power to be supplied to the heating element for a heating period, the heating period being shorter than or equal to the period of the periodic signal.

15 Claims, 5 Drawing Sheets

(51) Int. Cl.
  *A24F 40/53*    (2020.01)
  *H05B 1/02*     (2006.01)

(56) References Cited

U.S. PATENT DOCUMENTS

| | | | |
|---|---|---|---|
| 2014/0345633 A1 | 11/2014 | Talon et al. | |
| 2015/0237916 A1* | 8/2015 | Farine | A24F 40/53 |
| | | | 219/492 |
| 2017/0094719 A1* | 3/2017 | Voronin | H01L 21/67248 |
| 2017/0119981 A1 | 5/2017 | Davidson et al. | |
| 2017/0312120 A1* | 11/2017 | Kahlman | A61F 7/007 |
| 2019/0166918 A1* | 6/2019 | Thorsen | A24F 40/50 |
| 2019/0331535 A1* | 10/2019 | Zhuang | A61M 16/1095 |
| 2020/0154787 A1* | 5/2020 | Novak, III | H05B 1/0297 |
| 2022/0312854 A1* | 10/2022 | Boham | A24F 40/20 |

FOREIGN PATENT DOCUMENTS

| | | |
|---|---|---|
| WO | WO 2013/060781 A1 | 5/2013 |
| WO | WO 2014/040988 A2 | 3/2014 |
| WO | WO 2018/166925 A1 | 9/2018 |

OTHER PUBLICATIONS

International Search Report and Written Opinion (PCT/EP2020/076960), dated Jan. 22, 2021, 18 pages.
International Search Report (19199690.9-1004), dated Apr. 28, 2020, 12 pages.
Blu, "blu PRO e-cigarette", URL: https://web.archive.org/web/20200803124645/https://www.blu.com/en/US/blu-pro. Available at least as early as Aug. 3, 2020. Web page visited Jul. 18, 2025.
Blu, "myblu Vape Device", URL: https://web.archive.org/web/20191013173726/https://www.blu.com/en/US/e-cigs/blu-myblu-device-US.html. Available at least as early as Oct. 13, 2019. Web site visited Jul. 18, 2025.
British American Tobacco, "Glo", URL: https://web.archive.org/web/20240418201637/https://www.bat.com/brands-and-innovation/glo; available at least as early as Apr. 18, 2024; web page visited Jul. 18, 2025.
Philip Morris Intl, "IQOS Heated Tobacco Product", URL: https://web.archive.org/web/20230916052238/https://www.pmi.com/our-business/smoke-free-products/heated-tobacco-products. Available at least as early as Sep. 16, 2023. Web page visited Jul. 18, 2025.

* cited by examiner

SYSTEM FOR CONTROLLING A SMOKING SUBSTITUTE DEVICE

CROSS-REFERENCE TO RELATED APPLICATIONS/INCORPORATION BY REFERENCE STATEMENT

This application is a non-provisional application claiming benefit to the international application no. PCT/EP2020/076960 filed on Sep. 25, 2020, which claims priority to EP 19199690.9 filed on Sep. 25, 2019. The entire contents of each of the above-referenced applications are hereby incorporated herein by reference in their entirety.

FIELD OF THE DISCLOSURE

The present disclosure relates to a system for controlling a smoking substitute device and particularly, although not exclusively, to a system for controlling the supply of power to a heating element of a smoking substitute device.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapor" that is drawn into the lungs through the mouth (inhaled) and then exhaled. The inhaled aerosol typically bears nicotine and/or flavorings without, or with fewer of, the odor and health risks associated with traditional smoking.

In general, smoking substitute devices are intended to provide a substitute for the rituals of smoking, whilst providing the user with a similar experience and satisfaction to those experienced with traditional smoking and with combustible tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilizing a different smoking substitute approach. A smoking substitute approach corresponds to the manner in which the substitute system operates for a user.

One approach for a smoking substitute device is the so-called "vaping" approach, in which a vaporizable liquid, typically referred to (and referred to herein) as "e-liquid", is heated by a heating device to produce an aerosol vapor which is inhaled by a user. The e-liquid typically includes a base liquid as well as nicotine and/or flavorings. The resulting vapor therefore also typically contains nicotine and/or flavorings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapor") which is inhaled by a user through the mouthpiece.

Vaping smoking substitute devices can be configured in a variety of ways. For example, there are "closed system" vaping smoking substitute devices, which typically have a sealed tank and heating element. The tank is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, that consumable is disposed of. The main body can be reused by connecting it to a new, replacement, consumable. Another subset of closed system vaping smoking substitute devices are completely disposable, and intended for one-use only.

There are also "open system" vaping smoking substitute devices which typically have a tank that is configured to be refilled by a user. In this way the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapor which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one into the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapor which is inhaled by a user through the mouthpiece.

Another approach for a smoking substitute device is the so-called "heat not burn" ("HNB") (or Heated Tobacco ("HT")) approach in which tobacco (rather than e-liquid) is heated or warmed to release vapor. The tobacco may be leaf tobacco or reconstituted tobacco. The vapor may contain nicotine and/or flavorings. In the HNB approach the intention is that the tobacco is heated but not burned, i.e., does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapor. A vapor may be formed from a carrier in the tobacco material (this carrier may for example include propylene glycol and/or vegetable glycerin) and additionally volatile compounds released from the tobacco. The released vapor may be entrained in the airflow drawn through the tobacco.

As the vapor passes through the smoking substitute device (entrained in the airflow) from an inlet to a mouthpiece (outlet), the vapor cools and condenses to form an aerosol (also referred to as a vapor) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odor and/or health risks that can arise through the burning, combustion and pyrolytic degradation of tobacco.

An example of the HNB approach is the IQOS® smoking substitute device from Philip Morris Ltd. The IQOS® smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapor and flavorings which may be drawn through the mouthpiece by the user through inhalation.

A second example of the HNB approach is the device known as "Glo"® from British American Tobacco p.l.c. Glo® comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapor and flavorings which may be drawn through the consumable by the user through inhalation. The tobacco, when heated by the heating device, is configured to produce vapor when heated rather than when burned (as in a smoking apparatus, e.g., a cigarette). The tobacco may contain high levels of aerosol formers (carrier), such as vegetable glycerin ("VG") or propylene glycol ("PG").

Generally, in order to produce an aerosol which can be inhaled by a user, electrical power is supplied to a heating device when the smoking substitute device is activated. In some smoking substitute devices, electrical power may be supplied to the heating device when the device is switched on. In other smoking substitute devices, electrical power may be supplied to a heating device when inhalation by a user through the mouthpiece is detected.

The present inventors have observed that it would be desirable to further control the power supplied to the heating device, specifically in order to prevent the heating device from over-heating or under-heating the e-liquid/tobacco. Both over-heating and under-heating the e-liquid or tobacco may lead to an undesirable experience for a user. For example, in the case of HNB devices, over-heating the tobacco substrate may cause the tobacco to burn, thus exposing the user to potentially harmful substances. Under-heating the e-liquid/tobacco substrate may result in less aerosol being produced, thus providing a poor experience for the user.

The present disclosure has been devised in light of the above considerations.

SUMMARY OF THE DISCLOSURE

Broadly speaking, the present disclosure relates to a system for controlling a heating element of a smoking substitute device. More particularly, the present disclosure relates to a system for controlling the power supplied to a heating element of a smoking substitute device.

According to a first aspect of the disclosure, there is provided a system for controlling a smoking substitute device having a heating element, the system comprising:
 a receiver module configured to receive a periodic signal, the periodic signal in form of a series of signal events;
 a sensor configured to determine a temperature of the heating element in response to the receipt of a signal event of the periodic signal by the receiver module; and
 a controller, wherein:
 if the determined temperature is below a predetermined threshold, the controller is configured to cause power to be supplied to the heating element for a heating period, the heating period being shorter than or equal to the period of the periodic signal.

Optional features will now be set out. These are applicable singly or in any combination with any aspect.

The predetermined threshold may be a set-point temperature of the heating element, which is a preferred or optimal temperature of the heating element for producing an aerosol to be inhaled by a user.

Throughout this application, it should be understood that the terms "above" and "below" may also cover the terms "greater than or equal to" and "less than or equal to" respectively. In the present application, the periodic signal is made up of a series of signal events. In this application, the term "signal event" refers to a repeated feature of a waveform which arrives periodically at the receiver module. The sensor is configured to determine the temperature of the heating element at the arrival of each signal event at the receiver module.

The periodic signal may be a pulse wave, also known as a rectangular wave, or pulse train, having alternating "on" and "off" periods. Each signal event of the periodic signal may correspond to the leading/rising edge of each "on" period. Accordingly, each leading/rising edge of the "on" period may trigger the sensor to determine the temperature of the heating element. The periodic signal may also be in the form of a comb function, or a series of spikes, wherein the signal event may be the spike itself. The periodic signal may also be in the form of a sinusoidal signal, in which the signal event may be the point at which the amplitude or power of the sinusoidal signal exceeds a predetermined threshold. The skilled person will appreciate that a range of periodic signals and corresponding signal events could be used in the present disclosure.

In preferred elements of the disclosure, the sensor is configured to determine the temperature of the heating element in response to the receipt of each signal event by the receiver module.

If the determined temperature of the heating element is below the predetermined threshold, the controller is configured to cause power to be supplied to the heating element, in order to raise the temperature of the heating element to the predetermined threshold. This is not the case when the determined temperature is above the predetermined threshold, and no power is supplied to the heating element. In some embodiments, if the determined temperature is above the predetermined threshold, the controller is configured not to cause power to be supplied to the heating element. Alternatively, if the determined temperature is below the predetermined threshold, the controller is configured actively to prevent power from being supplied to the heating element.

In this way, the temperature of the heating element efficiently converges to the predetermined threshold. Furthermore, the temperature of the heating element at the predetermined threshold can be maintained with reduced overshoot during use of the smoking substitute device. Accordingly, over-heating and under-heating of an aerosol-former (such as e-liquid or tobacco substrate) can be reduced or prevented, and a better user experience can be achieved.

In some embodiments, the system includes an electronic switch connected between a power source and the heating element, wherein the controller is configured to control the electronic switch to cause power to be supplied to the heating element only when the determined temperature is below the predetermined threshold. In preferred embodiments, the electronic switch is a transistor such as a field-effect transistor, and more preferably a metal oxide semiconductor field-effect transistor (MOSFET). In such cases the controller may be configured to vary the voltage which is applied to a gate terminal of the MOSFET.

Additionally, the system allows for easy control within a limited means environment such as control circuits and software environments generally used in smoking substitute devices. Implementation of the system may also only require a small footprint in terms of memory of hardware, and so can be easily implemented into a smoking substitute device.

The controller may further be configured to compare the determined temperature with the predetermined threshold to thereby determine if the determined temperature is above or below the predetermined threshold.

In some embodiments, the sensor may be configured to determine the temperature only at each signal event of the periodic signal.

In other words, the temperature of the heating element is only determined upon each incidence (i.e., signal event) of the periodic signal. In embodiments in which the heating period is less than the period of the periodic signal, the sensor does not determine the temperature of the heating element again (and no power is supplied to the heating element) after the heating period, until the next incidence of the periodic signal. Accordingly, the periodic signal ensures that action (i.e., determining temperature, and supplying power to the heating element) is always undertaken at regular and discrete intervals. In this way, power may be conserved.

Furthermore, the system does not require Pulse Width Modulation (PWM) of the signal, because the temperature is determined synchronously with, and only at, each incidence of the periodic signal. This provides a simplified system.

The smoking substitute device may comprise an aerosol-former configured to be heated by the heating element in order to produce an aerosol for inhalation by a user. The aerosol-former may be an e-liquid contained in a tank (i.e., in vaping device), or a tobacco substrate (i.e., in a HNB device), for example. Accordingly, the smoking substitute device may be a vaping smoking substitute device (i.e., an e-cigarette device), or an HNB smoking substitute device.

Preferably, the controller is configured to cause power to be supplied to the heating element (if the determined temperature is below the predetermined threshold) if the determined temperature is less than the predetermined threshold minus a pre-set temperature value.

The pre-set temperature value may be fixed as a local value. This local value may provide a buffer so that if the determined temperature is only slightly below the target set-point temperature, power supply to the heating element is prevented, thereby reducing/preventing temperature overshoot.

The pre-set temperature value may be a device intrinsic parameter based on a dead time and a time constant of the aerosol-former and/or heating element in response to a temperature increase. The dead time of the aerosol-former/heating element is the delay between a supply of power to the heating element and the time at which the temperature of the aerosol-former begins to rise. The time constant is a measure of the rate of temperature increase of the aerosol-former after the temperature of the aerosol-former begins to rise. The dead time and the time constant depend on the specific properties of the aerosol-former and/or heating element.

In this way, the pre-set temperature value is adapted to the specific aerosol-former/heating element used. Therefore, the temperature of the heating element, and thus the aerosol-former, can be more accurately controlled.

The dead time and time constant of an aerosol-former/heating element can be measured using an impulse response of the aerosol-former to a heating stimuli. Upon this impulse response measurement, an estimation of the dead time and time constant of the aerosol-former/heating element can be calculated for the heating stimuli. The measurement of the dead time and time constant may be automated using mechanical, electrical or software means, or a combination of these means.

For each specific aerosol-former and/or heating element, the calibration measurement of dead time and time constant is only required to be measured once in order to determine the pre-set temperature value, and therefore calibrate the system. The calibration measurement can be performed during manufacture, in the lab, for example.

In this application, the term "periodic signal" refers to a signal in the form of a series of repeated signal events. In other words, the waveform of the periodic signal is in the form of a series of repeated features. The period of the periodic signal is defined at the time interval between the receipt of two consecutive signal events, and the frequency of the periodic signal is the inverse of the period, representing the number of features arriving within unit time. The term "periodic signal" should be understood to encompass, for example, cyclic and quasi-periodic signals.

The period of the periodic signal may be constant. In this way, each signal event of the periodic signal is regularly spaced so that the temperature determination of the heating element occurs at regular intervals.

Alternatively, the period of the periodic signal may vary during the use of the smoking substitute device.

In some embodiments, the period of the periodic signal may be variable. In this way, a user can vary the period of the periodic signal. The system may include an adjustment component which is user-adjustable to vary the period (and accordingly, the frequency) of the periodic signal.

The period of the periodic signal may be between 1 ms-1000 ms. Preferably, the period of the periodic signal is less than 100 ms, and more preferably, the period of the periodic signal is less than 20 ms.

In some embodiments, the duty cycle of the periodic signal may be constant. Specifically, the duty cycle of the periodic signal may be constant throughout the use of the smoking substitute device.

In alternative embodiments, the duty cycle of the periodic signal may vary during the use of the smoking substitute device. In these embodiments, the pulse width of the "on" period of the periodic signal may vary whilst the period remains constant, or the pulse width of the "on" period of the periodic signal may remain constant whilst the period varies.

The duty cycle of the periodic signal may be variable, such that a user can vary the duty cycle of the periodic signal. The system may include an adjustment component which is user-adjustable to vary the duty cycle of the periodic signal.

Alternatively, the duty cycle of the periodic signal may be fixed (i.e., not variable).

In some embodiments, the periodic signal may be received by the sensor. In these embodiments, the receiver module may be integral with the sensor. In alternative embodiments, the sensor may be separate from the receiving module.

The periodic signal may be received from a source external to the smoking substitute device, e.g., an external computing device.

Alternatively, the periodic signal may be received by the receiver module from a source within the smoking substitute device. For example, a microcontroller disposed in the smoking substitute device may generate and transmit the periodic signal to the receiver module, so that the periodic signal is received by the receiver module from the microcontroller. The microcontroller may be integral with the controller configured to prevent or allow the supply of power to the heating element. The microcontroller may be disposed in the smoking substitute device. In alternative embodiments, the microcontroller which generates the periodic signal may be external to the smoking substitute device, such as an external computing device. The system may include a sensor module which includes the sensor, and optionally the receiver module.

The periodic signal may be initiated using hardware, software, or firmware.

If the determined temperature is below the predetermined threshold, the controller may be configured to cause the supply of power to the heating element within 100 µs of a signal event of the periodic signal. In other words, within 100 µs of each signal event of the periodic signal, the sensor may determine the temperature of the heating element, compare the temperature of the heating element to the predetermined threshold, and either prevent or allow the supply of power to the heating element depending on the comparison result of the determined temperature with the predetermined threshold.

Preferably, if the determined temperature is below the predetermined threshold, the controller may be configured to cause the supply of power to the heating element within 50 µs of the signal event of the periodic signal, more preferably within 10 µs, and more preferably within 5 µs.

In this way, the signal event of the periodic signal, the determination of the temperature of the heating element, the comparison of the determined temperature with the predetermined threshold, and the action by the controller to either prevent or allow the supply of power to the heating element is substantially synchronous, with a negligible error in the µs range.

The sensor may be disposed in the smoking substitute device, and may be a resistance sensor configured to measure the resistance of the heating element. Alternatively, the sensor may be a thermistor.

The heating element may be a rod heater, a filament coil, a metal plate, or a blade. For example, in a vaping device, the heating element may be a coil, and in an HNB device, the heating element may be a rod heater, a metal plate or a blade. The heating element may be powered by a power source. The power source may be disposed within the smoking substitute device. Alternatively, the power source may be external to the smoking substitute device, but may be electrically connectable to the heating element in the smoking substitute device in order to power the heating element.

The smoking substitute device may comprise a passage for fluid flow therethrough. The passage may extend through (at least a portion of) the smoking substitute device, between openings that may define an inlet and an outlet of the passage. The outlet may be at a mouthpiece of the smoking substitute device.

In this respect, a user may draw fluid (e.g., air) into and through the passage by inhaling at the outlet (i.e., using the mouthpiece).

In a vaping device (or an e-cigarette device), the device may comprise a tank (reservoir) for containing a vaporizable liquid (e.g., an e-liquid). The e-liquid may, for example, comprise a base liquid and, e.g., nicotine. The base liquid may include propylene glycol and/or vegetable glycerin.

The tank may be defined by a tank housing. At least a portion of the tank housing may be translucent. For example, the tank housing may comprise a window to allow a user to visually assess the quantity of e-liquid in the tank. The tank may be referred to as a "clearomizer" if it includes a window, or a "cartomizer" if it does not. The passage may extend longitudinally within the tank and a passage wall may define the inner wall of the tank. In this respect, the tank may surround the passage, e.g., the tank may be annular. The passage wall may comprise longitudinal ribs extending therealong. These ribs may provide support to the passage wall. The ribs may extend for the full length of the passage wall. The ribs may project (e.g., radially outwardly) into the tank.

The smoking substitute device may comprise a vaporizer. The vaporizer may comprise a wick. The vaporizer may further comprise a heater. The wick may comprise a porous material. A portion of the wick may be exposed to fluid flow in the passage. The wick may also comprise one or more portions in contact with liquid stored in the reservoir. For example, opposing ends of the wick may protrude into the reservoir and a central portion (between the ends) may extend across the passage so as to be exposed to fluid flow in the passage. Thus, fluid may be drawn (e.g., by capillary action) along the wick, from the reservoir to the exposed portion of the wick.

The heater may comprise the heating element, which may be in the form of a filament wound about the wick (e.g., the filament may extend helically about the wick). The filament may be wound about the exposed portion of the wick. The heating element may be electrically connected (or connectable) to a power source. Thus, in operation, the power source may supply electricity to (i.e., apply a voltage across) the heating element so as to heat the heating element. This may cause liquid stored in the wick (i.e., drawn from the tank) to be heated so as to form a vapor and become entrained in fluid flowing through the passage. This vapor may subsequently cool to form an aerosol in the passage.

The device may comprise a consumable (i.e., aerosol-forming article) and an elongate main body. The consumable may be configured for engagement with the main body (i.e., so as to form the smoking substitute device). The main body may be configured for engagement with a heat-not-burn (HNB) consumable (heated tobacco (HT) consumable) or an e-cigarette consumable (or vaping consumable). For example, the consumable may comprise components of the system that are disposable, and the main body may comprise non-disposable or non-consumable components (e.g., power supply, controller, sensor, etc.) that facilitate the delivery of aerosol by the consumable. In such an embodiment, the aerosol former (e.g., e-liquid/tobacco substrate) may be replenished by replacing a used consumable with an unused consumable.

In light of this, it should be appreciated that some of the features described herein as being part of the smoking substitute device may alternatively form part of a main body for engagement with the consumable.

The main body and the consumable may be configured to be physically coupled together. For example, the consumable may be at least partially received in a recess of the main body, such that there is snap engagement between the main body and the consumable. Alternatively, the main body and the consumable may be physically coupled together by screwing one onto the other, or through a bayonet fitting.

Thus, the consumable may comprise one or more engagement portions for engaging with a main body. In this way, one end of the consumable (i.e., the inlet end) may be coupled with the main body, whilst an opposing end (i.e., the outlet end) of the consumable may define a mouthpiece.

In an HNB device, the heating element may comprise a rod that extends from the main body of the device. The rod may extend from the end of the main body that is configured for engagement with the aerosol-forming article (i.e., consumable).

In an HNB device, the heating element may be rigidly mounted to the main body of the smoking substitute device. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heating element may be a "blade heater"). The heating element may alternatively be in the shape of a tube (i.e., the heating element may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

In an HNB device, the heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the recess (of the main body of the device), and may extend (e.g., along a longitudinal axis) from an internal base of the recess towards an opening of the recess. The length of the heating element (i.e., along the longitudinal axis of the heating element) may be less than the depth of the recess. Hence, the heating element may extend for only a portion of the length of the recess. That is, the heating element may not extend through (or beyond) the opening of the recess.

The heating element may be configured for insertion into an aerosol-forming article (e.g., a HT consumable) when an aerosol-forming article is received in the recess. In that respect, a distal end (i.e., distal from a base of the heating element where it is mounted to the main body of the device) of the heating element may comprise a tapered portion, which may facilitate insertion of the heating element into the aerosol-forming article. The heating element may fully penetrate an aerosol-forming article when the aerosol-forming article is received in the recess. That is, the entire length, or substantially the entire length, of the heating element may be received in the aerosol-forming article.

The heating element may have a length that is less than, or substantially the same as, an axial length of an aerosol-forming substrate (such as a tobacco substrate) forming part of an aerosol-forming article (e.g., a HT consumable). Thus, when such an aerosol-forming article is engaged with the main body of the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

The heating element of the tube heater may surround at least a portion of the recess. When the portion of the aerosol-forming article is received in the recess, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the main body of the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The recess may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the recess may be formed from a thermally conductive material (e.g., a metal) to allow heat conduction from the heating element to the aerosol-forming article. Thus, heat may be conducted from the heating element, through the recess wall (or walls), to the aerosol-forming substrate of an aerosol-forming article received in the recess.

In some embodiments, the heating element may form part of an aerosol-forming article for use with the main body of the device. In such cases, the main body of the device may not comprise the heating element. Rather, the aerosol-forming article may comprise a heating element. Such arrangements may, for example, be suited to e-cigarette device (i.e., vaping devices) in which the aerosol-forming article comprises a tank containing an aerosol former (e.g., in liquid form). In such embodiments, the main body of the device may comprise means for connecting the main body of the device to the heating element of an aerosol-forming article engaged with the main body of the device. For example, the main body of the device may comprise one or more device connectors for (e.g., electrically) connecting the main body of the device to a corresponding heater connector of the aerosol-forming article. The connectors (i.e., of both the main body of the device and the aerosol-forming article) may be in the form of electrically conductive elements (e.g., plates) that contact when the aerosol-forming article is engaged with the main body of the device.

In some embodiments the main body of the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the main body of the device, and may be slidable between the open and closed positions.

The cap may define at least a portion of the recess of the main body of the device. That is, the recess may be fully defined by the cap, or each of the cap and main body may define a portion of the recess. Where the cap fully defines the recess, the cap may comprise an aperture for receipt of the heating element into the recess (when the cap is in the closed position). The cap may comprise an opening to the recess. The opening may be configured for receipt of at least a portion of an aerosol-forming article. That is, an aerosol-forming article may be inserted through the opening and into the recess (so as to be engaged with the main body of the device).

The cap may be configured such that when an aerosol-forming article is engaged with the main body of the device (e.g., received in the recess), only a portion of the aerosol-forming article is received in the recess. That is, a portion of the aerosol-forming article (not received in the recess) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

In an HNB device, and in order to generate an aerosol, the aerosol-forming substrate may comprise at least one volatile compound that is intended to be vaporized/aerosolized and that may provide the user with a recreational and/or medicinal effect when inhaled. Suitable chemical and/or physiologically active volatile compounds include the group consisting of: nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris,* Yellow Tees, *Galea zacatechichi, Canavalia maritima* (Bay bean), *Cecropia mexicana* (Guamura), *Cestrum nocturnum, Cynoglossum virginianum* (wild comfrey), *Cytisus scoparius, Damiana, Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco). *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora* incamata (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The HNB article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the HNB article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the HNB article/consumable may comprise an aerosol-cooling element which is adapted to cool the aerosol generated from the aerosol-forming substrate (by heat exchange) before being inhaled by the user.

The HNB article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

The main body or the consumable may comprise a power source or be connectable to a power source. The power source may be electrically connected (or connectable) to the heater/heating element. The power source may be a battery (e.g., a rechargeable battery). An external electrical connector in the form of, e.g., a USB port may be provided for recharging this battery.

The consumable may comprise an electrical interface for interfacing with a corresponding electrical interface of the main body. One or both of the electrical interfaces may include one or more electrical contacts. Thus, when the main body is engaged with the consumable, the electrical interface may be configured to transfer electrical power from the power source to a heater of the consumable. The electrical interface may also be used to identify the consumable from a list of known types. The electrical interface may additionally or alternatively be used to identify when the consumable is connected to the main body.

The main body may alternatively or additionally be able to detect information about the consumable via an RFID reader, a barcode or QR code reader. This interface may be able to identify a characteristic (e.g., a type) of the consumable. In this respect, the consumable may include any one or more of an RFID chip, a barcode or QR code, or memory within which is an identifier and which can be interrogated via the interface.

The controller may include a microprocessor. The controller may be configured to control the supply of power from the power source to the heater (e.g., via the electrical contacts). A memory may be provided and may be operatively connected to the controller. The memory may include non-volatile memory. The memory may include instructions which, when implemented, cause the controller to perform certain tasks or steps of a method.

The consumable or main body may comprise a wireless interface, which may be configured to communicate wirelessly with another device, for example a mobile device, e.g., via Bluetooth®. To this end, the wireless interface could include a Bluetooth® antenna. Other wireless communication interfaces, e.g., WIFI®, are also possible. The wireless interface may also be configured to communicate wirelessly with a remote server.

An airflow (i.e., puff) sensor may be provided that is configured to detect a puff (i.e., inhalation from a user). The airflow sensor may be operatively connected to the controller so as to be able to provide a signal to the controller that is indicative of a puff state (i.e., puffing or not puffing). The airflow sensor may, for example, be in the form of a pressure sensor or an acoustic sensor. The controller may control power supply to the heater in response to airflow detection by the sensor. The control may be in the form of activation of the heater in response to a detected airflow. The airflow sensor may form part of the consumable or the main body.

The vaping device may be a non-consumable device in which an aerosol former (e.g., e-liquid) of the device may be replenished by re-filling the tank of the device (rather than replacing the consumable). In this embodiment, the consumable described above may instead be a non-consumable component that is integral with the main body. Thus, the device may comprise the features of the main body described above. In this embodiment, the only consumable portion may be e-liquid contained in the tank of the device. Access to the tank (for re-filling of the e-liquid) may be provided via, e.g., an opening to the tank that is sealable with a closure (e.g., a cap).

According to a second aspect of the disclosure, there is provided a method for controlling a smoking substitute device having a heating element, the method comprising:

receiving a periodic signal, the periodic signal being in the form of a series of signal events;

determining, by a sensor, the temperature of the heating element in response to the receipt of a signal event of the periodic signal;

comparing the determined temperature with a predetermined threshold;

if the determined temperature is below the predetermined threshold, supplying power to the heating element for a heating period, wherein the heating period is shorter than or equal to the period of the periodic signal.

Preferably, the method further includes, if the determined temperature is above the predetermined threshold, preventing the supply of power to the heating element.

According to a third aspect of the disclosure, there is provided a computer-readable storage medium comprising instructions which, when executed by a computer, cause the computer to carry out the method of the second aspect. Specifically, when executed by a computer, the instructions cause the computer to carry out the steps of:

receiving a periodic signal, the periodic signal being in the form of a series of signal events;

determining, by a sensor, the temperature of a heating element of a smoking substitute device at each signal event of the periodic signal;

comparing the determined temperature with a predetermined threshold;

if the determined temperature is above a predetermined threshold, preventing the supply of power to the heating element; and if the determined temperature is below the predetermined threshold, supplying power to the heating element for a heating period, wherein the heating period is shorter than or equal to the period of the periodic signal.

The disclosure includes the combination of the aspects and preferred features described except where such a combination is clearly impermissible or expressly avoided.

BRIEF DESCRIPTION OF THE FIGURES

So that the disclosure may be understood, and so that further aspects and features thereof may be appreciated, embodiments and experiments illustrating the principles of the disclosure will now be discussed in further detail with reference to the accompanying figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

Figure 1A:
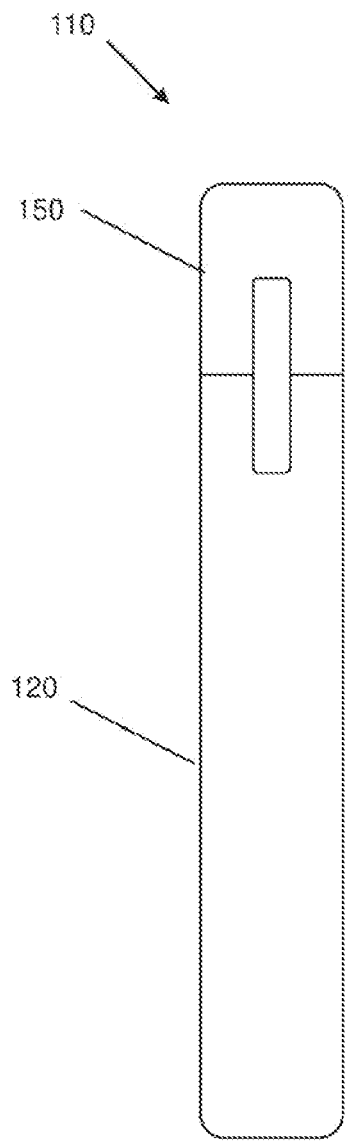
FIG. 1A shows an example smoking substitute device.

FIG. 1A shows an example vaping smoking substitute device 110 controllable by the method of the present disclosure. In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only. The system and method of the present disclosure can also control other smoking substitute devices, such as an open system vaping device, or an HNB device.

FIG. 1A shows the smoking substitute device 110 with the main body 120 physically coupled to the consumable 150.

Figure 1B:
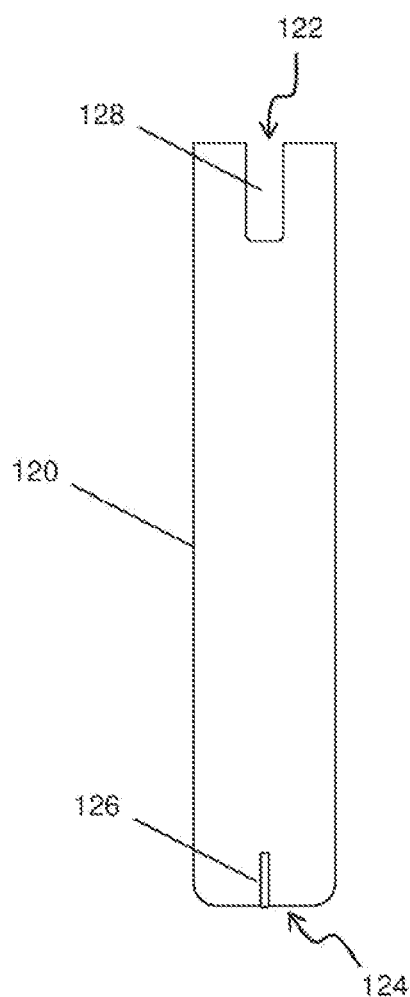
FIG. 1B shows a main body of the smoking substitute device of FIG. 1A without a consumable.

FIG. 1B shows the main body 120 of the smoking substitute device 110 without the consumable 150.

Figure 1C:
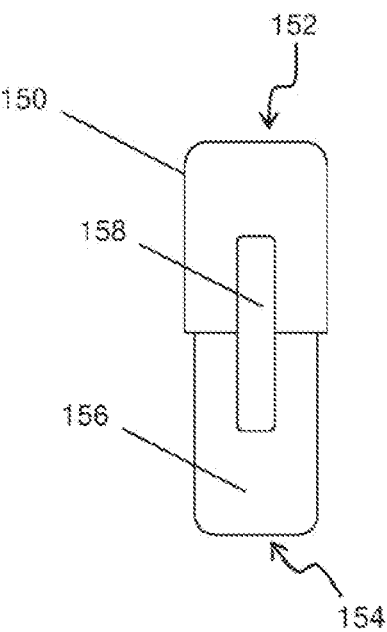
FIG. 1C shows the consumable of the smoking substitute device of FIG. 1A without the main body.

FIG. 1C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 302 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

Figure 2A:
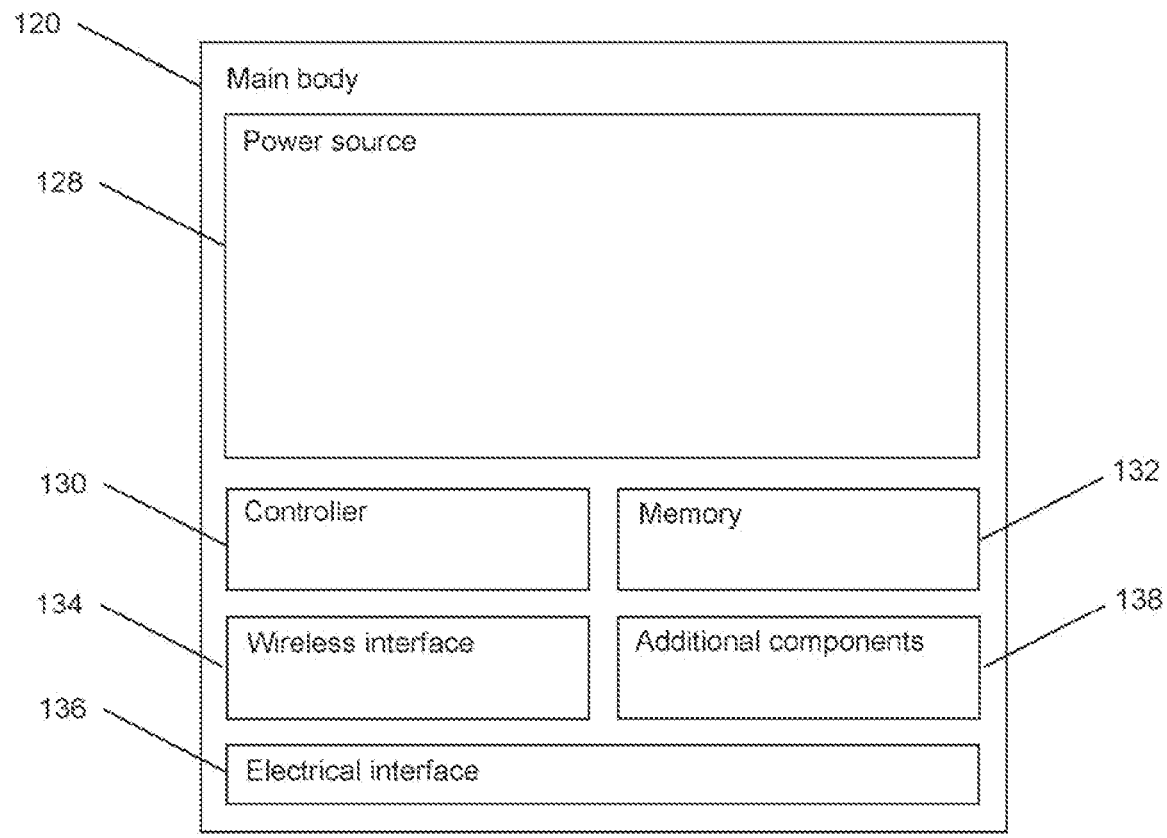
FIG. 2A is a schematic view of the main body of the smoking substitute device of FIG. 1A.

FIG. 2A is a schematic view of the main body 120 of the vaping smoking substitute device 110.

Figure 2B:
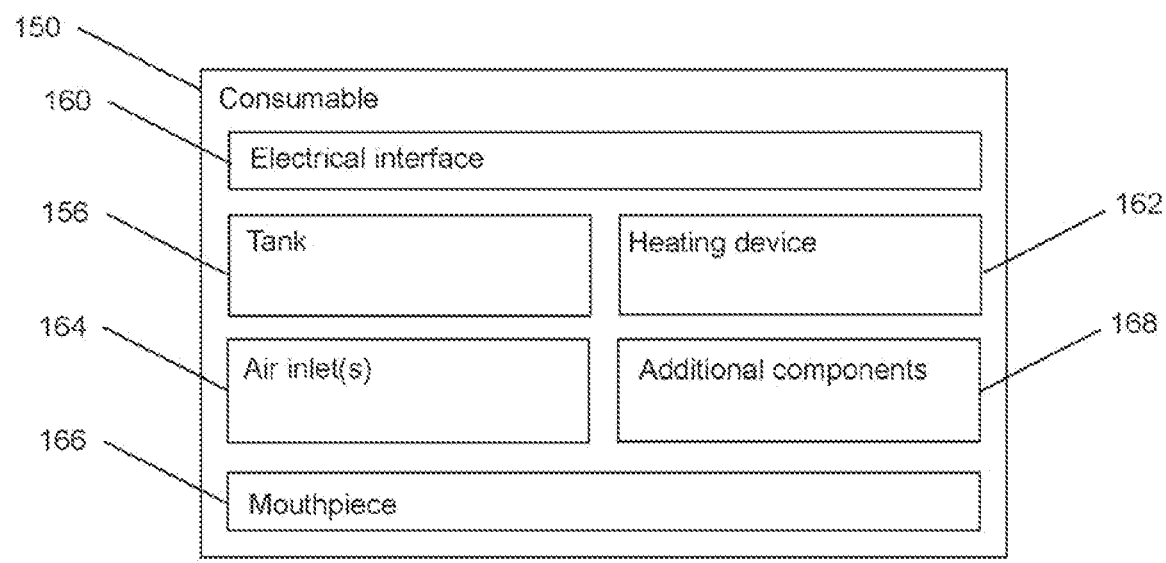
FIG. 2B is a schematic view of the consumable of the smoking substitute device of FIG. 1A.

FIG. 2B is a schematic view of the consumable 150 of the vaping smoking substitute device 110.

As shown in FIG. 2A, the main body 120 includes a power source 128, a controller, 130, a memory 132, a wireless interface 134, an electrical interface 136, and, optionally, one or more additional components 138.

The power source 128 is preferably a battery, more preferably a rechargeable battery.

The controller 130 may include a microprocessor, for example.

The memory 132 preferably includes non-volatile memory.

The wireless interface 134 is preferably configured to communicate wirelessly with an external device, such as a mobile device, e.g., via Bluetooth. To this end, the wireless interface 134 could include a Bluetooth™ antenna. Other wireless communication interfaces, e.g., WIFI, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from a charging station.

The additional components 138 of the main body 120 may include the optional light 126 discussed above.

The additional components 138 of the main body 120 may, if the power source 128 is a rechargeable battery, include a charging port configured to receive power from a charging station. This may be located at the bottom end 124 of the main body 120. Alternatively, the electrical interface 136 discussed above is configured to act as a charging port configured to receive power from a charging station such that a separate charging port is not required.

The additional components 138 of the main body 120 may, if the power source 128 is a rechargeable battery, include a battery charging control circuit, for controlling the charging of the rechargeable battery.

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 2B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapor.

The one or more air inlets 164 are preferably configured to allow air to be drawn into the smoking substitute device 110, when a user inhales through the mouthpiece 166.

The additional components 168 of the consumable 150 may include a machine readable data source, which may, e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapor which is inhaled by a user through the mouthpiece 166.

Of course, a skilled reader would readily appreciate that the smoking substitute device 110 shown in FIGS. 1 and 2 shows just one example implementation of a smoking substitute device, and that other forms of smoking substitute device could be used with the method and system of the present disclosure.

By way of example, a HNB smoking substitute device including a main body and a consumable could be controlled by the method and system of the present disclosure, instead of the smoking substitute device 110. One such HNB smoking substitute device is the IQOS™ smoking substitute device discussed above.

Specifically, a HNB smoking substitute device controllable by the method of the present disclosure may comprise an HNB main body and an HNB consumable. The HNB main body and HNB consumable may be configured such that the consumable can be engaged with the device. The HNB main body may comprise a body and a cap. In use, the cap may be engaged at an end of the body, and the cap may be moveable relative to the body. In particular the cap may be slidable and may slide along a longitudinal axis of the body.

The HNB consumable comprises an aerosol forming substrate (such as a tobacco substrate) located at an upstream end of the consumable. The aerosol-forming substrate may be substantially cylindrical and comprises the aerosol former of the device. The aerosol-forming substrate is configured to be heated by a heating element to release a vapor. The released vapor is subsequently entrained in an airflow flowing through the aerosol-forming substrate. The airflow is produced by the action of the user drawing on a downstream (i.e., terminal or mouth) end of the consumable.

In order to generate an aerosol, the aerosol forming substrate comprises at least one volatile compound that is intended to be vaporized/aerosolized and they may provide the user with a recreational and/or medicinal effect when inhaled.

The heating element of the HNB device may be rigidly mounted to the main body of the HNB device, such that when the HNB consumable is received in a recess of the main body, the heating element penetrates the aerosol-forming substrate of the consumable in order to heat the aerosol-forming substrate and generate an aerosol.

Similar to vaping smoking substitute device 100 described above with reference to FIGS. 1A-C, 2A and 2B, the main body of the HNB device includes a power source and a controller, wherein the heating element is powered by the power source, and controlled by the controller. The heating element heats the aerosol forming substrate (e.g., tobacco substrate) to release vapor for inhalation.

As another example, an open system vaping device which includes a main body, a refillable tank, and a mouthpiece could be controlled by the method and system of the present disclosure, instead of the smoking substitute device 110. One such open system vaping device is the blu PRO™ e-cigarette discussed above.

As another example, an entirely disposable (one use) smoking substitute device could be controlled by the method and system of the present disclosure, instead of the smoking substitute device 110.

Figure 3:
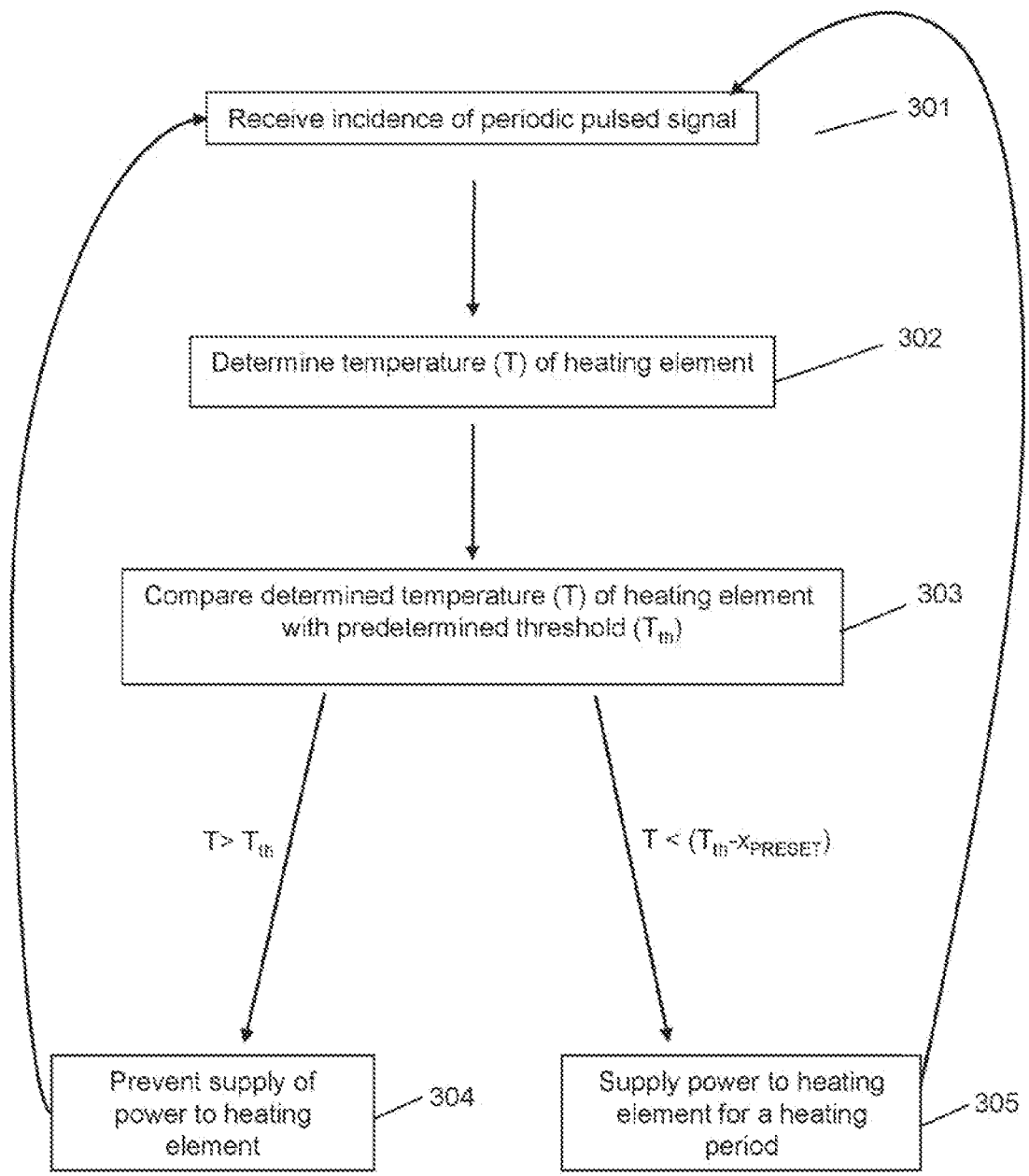
FIG. 3 is a flowchart illustrating a method for controlling the smoking substitute device of FIG. 1A.

FIG. 3 is a flowchart illustrating a method for controlling a smoking substitute device having a heating element, such as the heating filament in heating device 162 of smoking substitute device 110 described above in relation to FIGS. 1 and 2.

The heating element is configured to receive a supply of power from a power source in order to heat an aerosol-former to generate an aerosol to be inhaled by a user. In the example of the smoking substitute device 110 in FIGS. 1 and 2, the filament coil of the heating device 162 is configured to heat the e-liquid contained within tank 156 when power is supplied by the power source 128 through the electrical interfaces 136, 160 to the filament coil. In an HNB device, the heating element may be a blade, a rod heater or a metal plate, which may heat a tobacco substrate to thereby generate an aerosol for inhalation by a user.

In the example shown in FIG. 2, the power source 128 is contained within the main body 120 of the smoking substitute device 110. In other systems, the power source may be contained within the consumable 150, or may even be external to the smoking substitute device, in an external device electrically connectable to the heating element in order to power the heating element.

The method of controlling the supply of power to the heating element shown in FIG. 3 prevents the heating element from overheating or under-heating the aerosol-former. Specifically, the supply of power to the heating element is controlled by a controller, such as controller 130 of FIG. 2.

At step 301, a periodic signal is received by the smoking substitute device. Specifically, step 301 is performed by a receiver module disposed in the smoking substitute device. The periodic signal may be received from a source within the smoking substitute device itself (i.e., from controller 130), or from a source external to the smoking substitute device. The periodic signal may be initiated using hardware, software or firmware.

At step 302, the temperature (T) of the heating element is determined by a sensor, which may be integral with or separate from the receiver module. The sensor may directly measure the temperature of the heating element, or alternatively, the sensor may measure a physical characteristic of the heating element and/or aerosol former indicative of the temperature of the heating element. For example, the sensor may measure the resistance of, or the current through, the heating element.

The determination of the temperature (T) of the heating element is triggered by a signal event of the periodic signal received in step 301.

At step 303, the controller compares the determined temperature (T) of the heating element with a predetermined threshold temperature ($T_{th}$). The predetermined threshold is a set-point temperature of the heating element which provides an optimal/preferred temperature of the heating element for heating the aerosol-former in order to generate an aerosol for inhalation by a user. The set-point temperature may be 200° C., for example.

If, at step 303, determined temperature (T) of the heating element is greater than the predetermined threshold ($T_{th}$), the method moves to step 304. At step 304, the controller prevents the supply of power from the power source to the heating element (i.e., causes power not to be supplied to the heating element). Therefore, the temperature of the heating element is prevented from continuing to rise above the set-point temperature, and over time will cool and return to the set-point temperature.

At step 303, the controller may also compare the determined temperature (T) of the heating element with the predetermined threshold (TO minus a pre-set temperature value ($x_{PRESET}$) (not illustrated in FIG. 3).

If, at step 303, the determined temperature (T) of the heating element is less than the predetermined threshold minus a pre-set temperature value ($x_{PRESET}$), the method moves to step 305. At step 305, the controller instructs the supply of power to the heating element for a heating period. The heating period is shorter than or equal to the period of the periodic signal, and is predetermined. This raises the temperature of the heating element towards the set-point temperature.

Although not shown in FIG. 3, in some embodiments, if the controller determines at step 303 that the determined temperature (T) is less than the predetermined threshold ($T_{th}$), but greater than the predetermined threshold ($T_{th}$) minus the pre-set temperature value ($x_{PRESET}$), the method may move to step 304, where the controller prevents the supply of power from the power source to the heating element.

The pre-set temperature provides a buffer in order to prevent temperature overshoot of the heating element. It may be fixed as a local value, or may be a device intrinsic parameter (i.e., specific to the type of device, type of heating element and/or type of aerosol former). The device intrinsic parameter is based on a dead time and a time constant of the aerosol-former and/or heating element in response to a temperature increase. The dead time of the aerosol-former/heating element is the delay between the supply of power to the heating element and the time at which the temperature of the aerosol-former begins to rise. The time constant is a measure of the rate of temperature increase of the aerosol-former after the temperature of the aerosol-former begins to rise. Both the dead time and the time constant depend on the specific properties/type of aerosol-former and/or heating element.

After either step 304 or 305, the method returns to step 301, and steps 301-303 and either 304 or 305 are repeated. Specifically, step 301 repeats periodically, at each signal event of the periodic signal, thereby controlling the temperature of the heating element to efficiently converge to the set-point temperature.

Figure 4:
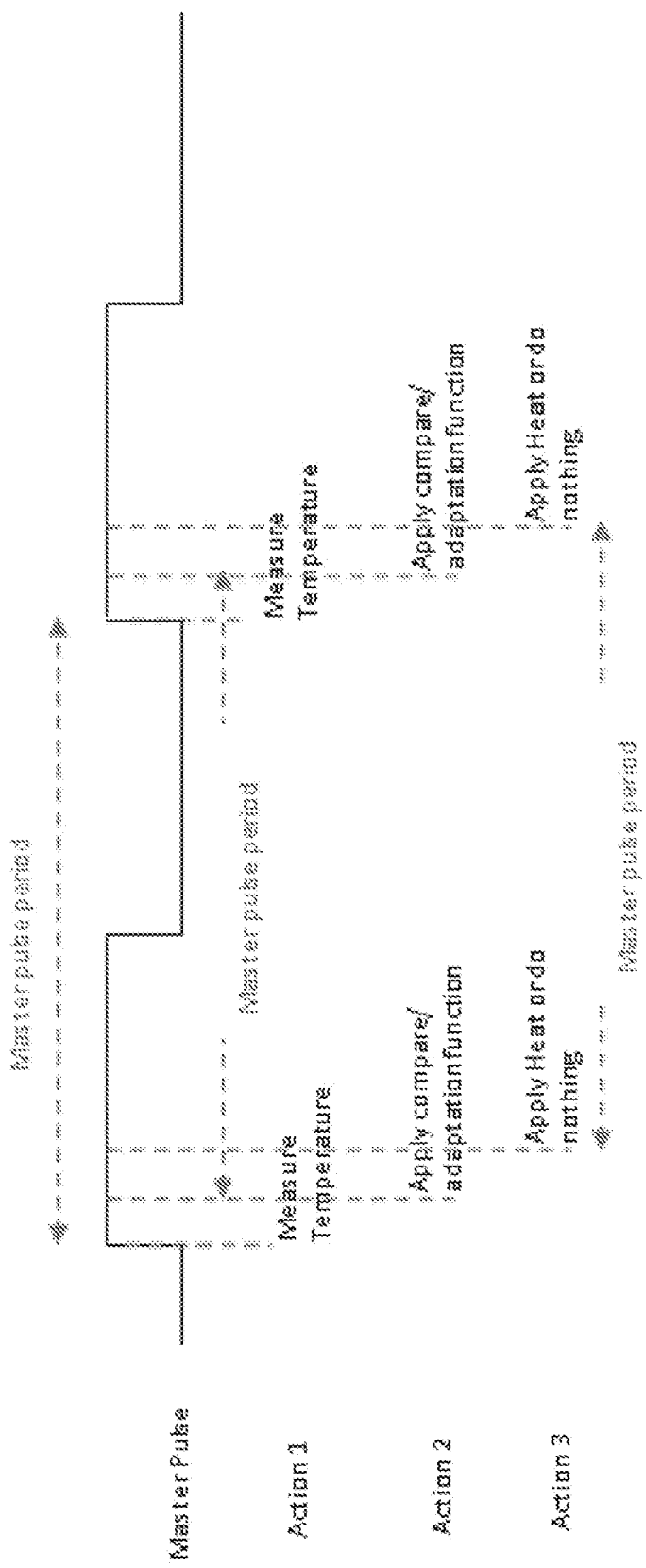
FIG. 4 is a diagram illustrating a method for controlling the smoking substitute device of FIG. 1A.

The periodic signal is illustrated in FIG. 4 (shown as "Master pulse"). The periodic signal is a pulse wave, also known as a rectangular wave, or pulse train, having alternating "on" and "off" periods. The periodic signal provides a clock/timing control signal, wherein the rising/leading edge of each "on" period (herein referred to as each signal event of the periodic signal), triggers the sensor to determine the temperature of the heating element.

In FIG. 4, the period of the periodic signal is constant. Therefore, signal events (i.e., incidences) of the periodic signals are equally spaced, and each determination of the temperature of the heating element (i.e., Action 1 in FIG. 4) is at consistent and equal intervals.

Furthermore, the duty cycle of the periodic signal is constant. In other words, the ratio of the "on" and "off" periods is the same for each period of the periodic signal. In FIG. 4, the periodic signal has a 50% duty cycle, so that the signal is "on" (i.e., active) for 50% of the time. However, the periodic signal may have a different duty cycle, such as 10%, 20%, 30%, 40%, 60%, 70%, 80%, 90%, or any other duty cycle.

In other embodiments, the period of the periodic signal may vary during the use of the smoking substitute device. Accordingly, signal events of the periodic signals may be unequally spaced.

Similarly, the duty cycle of the periodic signal may vary during the use of the smoking substitute device. In these embodiments, the pulse width of the "on" period may vary while the period remains constant, the pulse width of the "on" period may be constant as the period varies, or both the pulse width of the "on" period and the period may vary.

Although not shown in the figures, the period and/or the duty cycle of the periodic signal may be fixed or variable.

FIG. 4 labels the determination of temperature of the heating element at each signal event (i.e., each rising/leading edge) of the periodic signal as Action 1. The sensor is configured to determine the temperature of the heating element only at each signal event of the periodic signal, and not in between each signal event.

Upon determination of the temperature of the heating element, the controller compares the determined temperature (T) with the predetermined threshold ($T_{th}$). This is labelled as Action 2 in FIG. 4. Specifically, the controller applies a compare/adaptation function in order to compare the determined temperature (T) with the predetermined threshold ($T_{th}$). The controller also determines whether the determined temperature (T) is above or below the predetermined threshold ($T_{th}$).

If the determined temperature is above the predetermined threshold, the heating element is not powered (i.e., the supply of power to the heating element is prevented), whereas if the determined temperature is below the predetermined threshold (and in some embodiments, below the predetermined threshold minus a pre-set temperature value), the heating element is powered and heats up. This is labelled as Action 3 in FIG. 4.

Actions 1, 2 and 3 occur within microseconds of the signal event of the periodic signal, such that they are substantially synchronous with each signal event of the periodic signal. For example, Actions 1, 2 and 3 may all occur within 5 μs of the signal event of the periodic signal.

Figure 5A:
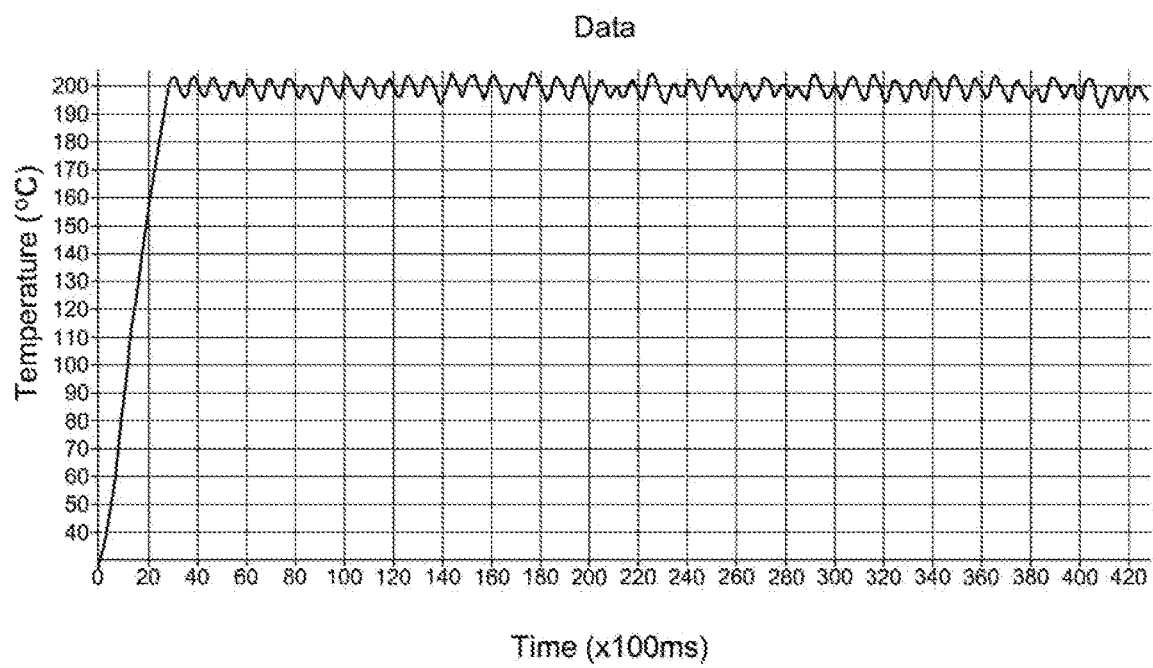
FIGS. 5A and 5B are experimental results showing the temperature of a heating element of a smoking substitute device when the temperature of the heating element is controlled using the method illustrated in FIG. 3.
Figure 5B:
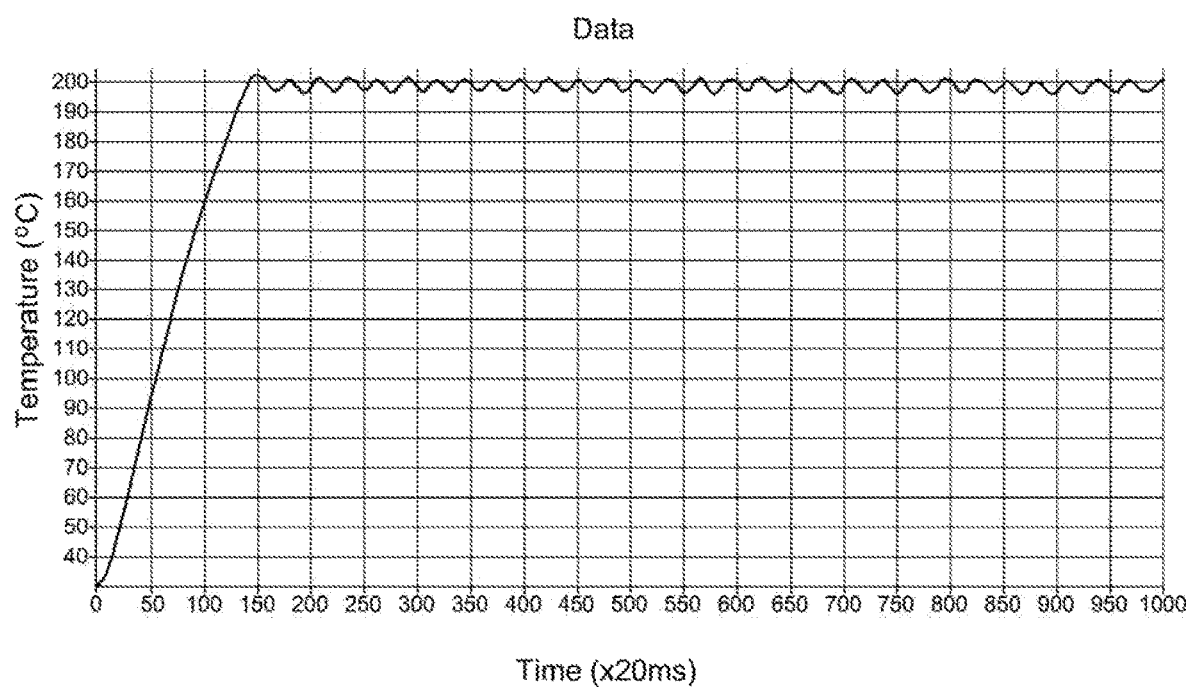

FIGS. 5A and 5B show experimental results obtained using custom developed software for data acquisition control and display under Windows, where a heating element is controlled according to the method and system of the present disclosure. The heating element was driven by a power supply, and the current was gated onto the heating element using a MOSFET transistor. The data acquisition employed a 16-bit ADC for reading temperature from a Pt100 temperature sensor and a digital pulse was used to switch the MOFSET transistor.

Output was obtained using a flat metal plate heating element having an impedance of over 1.6 Ohm at room temperature. The current source was held at 3.7 Volts.

The heating period was equal to the period of the periodic signal, and the step-point temperature (i.e., predetermined threshold) was set at 200° C.

FIG. 5A displays the temperature control results for the flat metal plate heating element with a periodic signal having a period of 100 ms. As shown in FIG. 5A, the temperature of the heating element efficiently converges to the 200° C. set point temperature and is maintained at the 200° C. set point temperature with a +/−4° C. overshoot/undershoot.

FIG. 5B displays the temperature control results for the flat metal plate heating element with a periodic signal having a period of 20 ms. Similar to in FIG. 5A, the temperature of the heating element efficiently converges and is maintained at the 200° C. set point temperature, but the overshoot/undershoot of the temperature is reduced to +/−2° C. Accordingly, the level of noise around the set-point temperature is reduced by decreasing the period of the periodic signal (and therefore by increasing the frequency of the periodic signal). Therefore, it is preferable for the period of the periodic signal to be less than or equal to 20 ms.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

What is claimed is:

1. A system for controlling a smoking substitute device having a heating element, the system comprising:
   a receiver module configured to receive a periodic signal, the periodic signal being in the form of a series of signal events;
   a sensor configured to determine a temperature of the heating element in response to the receipt of a signal event of the periodic signal by the receiver module; and
   a controller, wherein:
      if the determined temperature is below a predetermined threshold, the controller is configured to cause power to be supplied to the heating element for a heating period, the heating period being shorter than or equal to the period of the periodic signal.

2. A system according to claim 1, wherein if the determined temperature is above the predetermined threshold, the controller is configured to cause power not to be supplied to the heating element.

3. A system according to claim 1, wherein the sensor is configured to determine the temperature of the heating element only at each signal event of the periodic signal.

4. A system according to claim 1, wherein the controller is configured to cause power to be supplied to the heating element if the determined temperature is less than the predetermined threshold minus a pre-set temperature value.

5. A system according to claim 4, wherein the smoking substitute device further comprises an aerosol-former to be heated by the heating element, and the pre-set temperature value is a device intrinsic parameter based on a dead time and a time constant of the aerosol-former.

6. A system according to claim 1, wherein the period of the periodic signal is constant.

7. A system according to claim 1, wherein the period of the periodic signal is variable.

8. A system according to claim 1, wherein the period of the periodic signal is in the range of 1 ms-1000 ms.

9. A system according to claim 1, wherein a duty cycle of the periodic signal is the ratio of ON and OFF periods for each period of the periodic signal, and wherein the duty cycle of the periodic signal is constant.

10. A system according to claim 1, wherein a duty cycle of the periodic signal is the ratio of ON and OFF periods for each period of the periodic signal, and wherein the duty cycle of the periodic signal is variable.

11. A system according to claim 1, wherein the receiver module is configured to receive the periodic signal from a microcontroller disposed in the smoking substitute device.

12. A system according to claim 1, wherein if the determined temperature is below the predetermined threshold, the controller is configured to cause the supply of power to the heating element within 100 µs of the signal event of the periodic signal.

13. A system according to claim 1, wherein the sensor is a resistance sensor.

14. A method for controlling a smoking substitute device having a heating element, the method comprising:
   receiving a periodic signal, the periodic signal being in the form of a series of signal events;
   determining, by a sensor, the temperature of the heating element in response to the receipt of a signal event of the periodic signal;
   comparing the determined temperature with a predetermined threshold; and
   if the determined temperature is below the predetermined threshold, supplying power to the heating element for a heating period, wherein the heating period is shorter than or equal to the period of the periodic signal.

15. A method according to claim 14, wherein the method further comprises, if the determined temperature is above the predetermined threshold, preventing the supply of power to the heating element.

* * * * *